S. MILNE.
EXPANDING REEL BAR OR CORE FOR USE IN WINDING AND UNWINDING PAPER, CLOTH, AND LIKE MATERIAL.
APPLICATION FILED APR. 5, 1913.

1,122,627.

Patented Dec. 29, 1914.

S. MILNE.
EXPANDING REEL BAR OR CORE FOR USE IN WINDING AND UNWINDING PAPER, CLOTH, AND LIKE MATERIAL.
APPLICATION FILED APR. 5, 1913.

1,122,627.

Patented Dec. 29, 1914.
3 SHEETS—SHEET 3.

Witnesses:-
John C. Sanders
M. B. Cottrell

Inventor:-
Samuel Milne
By his Attorney:- Thos Wallace White

UNITED STATES PATENT OFFICE.

SAMUEL MILNE, OF EDINBURGH, SCOTLAND.

EXPANDING REEL BAR OR CORE FOR USE IN WINDING AND UNWINDING PAPER, CLOTH, AND LIKE MATERIAL.

1,122,627.  Specification of Letters Patent.  Patented Dec. 29, 1914.

Application filed April 5, 1913. Serial No. 759,156.

*To all whom it may concern:*

Be it known that I, SAMUEL MILNE, a subject of the King of Great Britain and Ireland, and resident of Edinburgh, Scotland, have invented certain new and useful Improvements in or Relating to Expanding Reel Bars or Cores for Use in Winding and Unwinding Paper, Cloth, and like Material, of which the following is a specification.

This invention relates to and consists of an improved construction of expanding reel bar or core for winding or unwinding paper, cloth and the like.

According to the invention the improved bar or core consists of a spindle or shaft formed along its entire working length, or at intervals, with one or more facets or clutch surfaces.

It also consists of one or more rods or rollers which on the bar or core being slipped into the reel or reel shell lie between the facets or clutch surfaces and the reel or shell.

With the reel or shell held stationary and the spindle given a partial rotation the rollers bind against the spindle and the inner face of the reel or shell and thus clutch the spindle to the shell or vice versa. On giving the spindle a partial rotation in the reverse direction with the reel held stationary the rollers free the spindle and allow it to be withdrawn.

Figure 1:
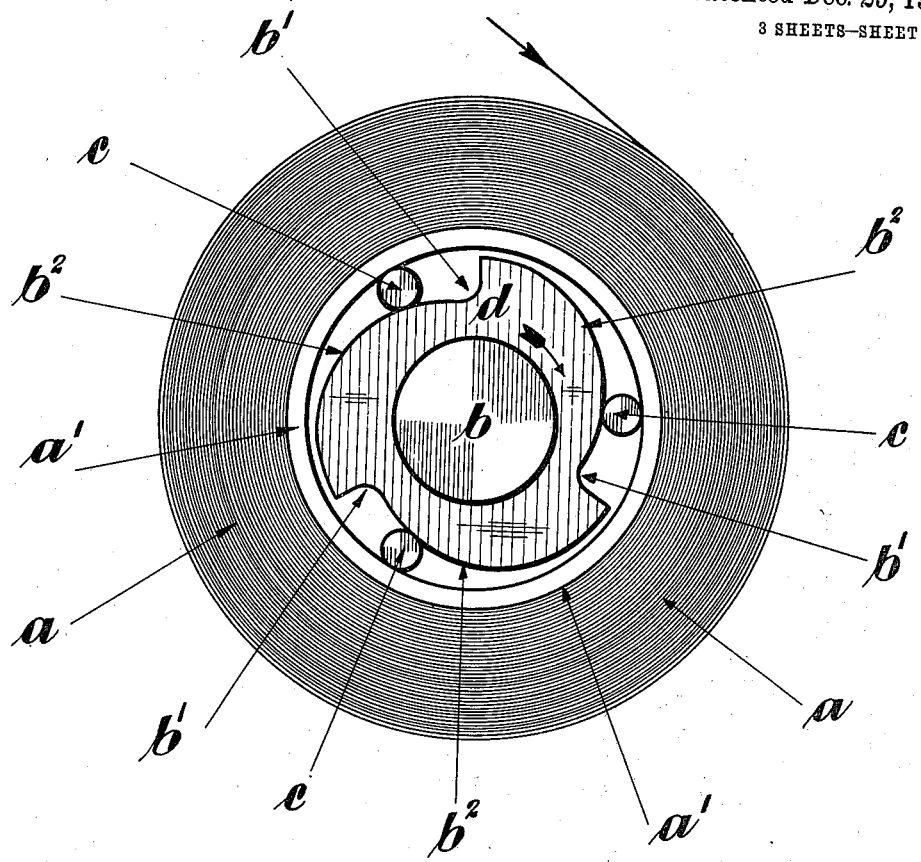
Figure 2:
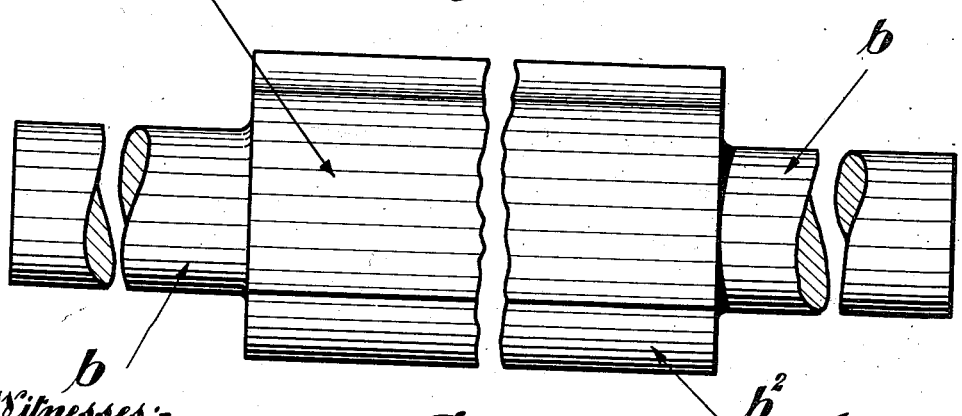

Upon the accompanying drawing, Figure 1 illustrates an end view showing the application of the invention to a reel. Fig. 2 illustrates a side view (partly broken away) of the core or spindle. Figs. 3 to 7 illustrate modifications.

$a$ is the reel within which or its shell $a'$ the expandible core or spindle is placed when requiring to wind or unwind paper or other material on to and off the reel. The expandible core or spindle, as shown, consists of a shaft or spindle $b$ formed with longitudinal recesses $b'$ one part of each of which is deeper than the other parts and each recess thus producing an inclined clutch surface $b^2$. The recesses will preferably extend the full working length of the shaft $b$ as shown in Fig. 2. With the shaft or spindle inserted in the reel, or reel shell a series of circular rods or bars $c$ are placed one in each recess $b'$, the rods or bars normally lying within the deeper part of each recess. It should now be seen that on rotating the core or spindle $b$, in the direction of the arrow $d$, and with the reel offering a resistance to rotation, the rods $c$ will become wedged between the inclined faces $b^2$ and the inner surface of the reel shell $a'$ and thus lock or clutch the core to the reel, which will then rotate with the core so long as it is rotated in the same direction. With the parts arranged, as shown, and rotating in the direction of the arrow $d$ the spindle is adapted for winding purposes. On the reel being held stationary and the spindle given a slight rotation in a direction opposite to that of the arrow $d$, the rods $c$ become freed or released from the reel and move into the deeper parts of the recesses $b'$ the core $b$ and rods $c$ being then ready to be removed if required. When the core or spindle is required for unwinding purposes and the unwinding has to be done positively the shaft will be withdrawn and inserted the reverse way. Of course, when the reel has to be unwound by merely pulling the material off the spindle need not be reversed. The spindle may be provided with a gear wheel and be formed with a squared end for the reception of a handle or the like for turning purposes. In addition to serving to clutch the reel shell to the spindle the invention allows of the same bar or core being used with shells of different diameters.

While showing three recesses and three rods, it will be understood that there may be less or more according to the size of expander. Further, the inclined faces $b^2$ may extend only part of the way along the shaft $b$ from one or both ends and the rods be of corresponding lengths, but usually they will be made as described and shown. Also there may be end plates on the shaft with inclined slots corresponding to the inclined faces by which the rods or rollers would always be kept intact with the shaft.

Figure 3:
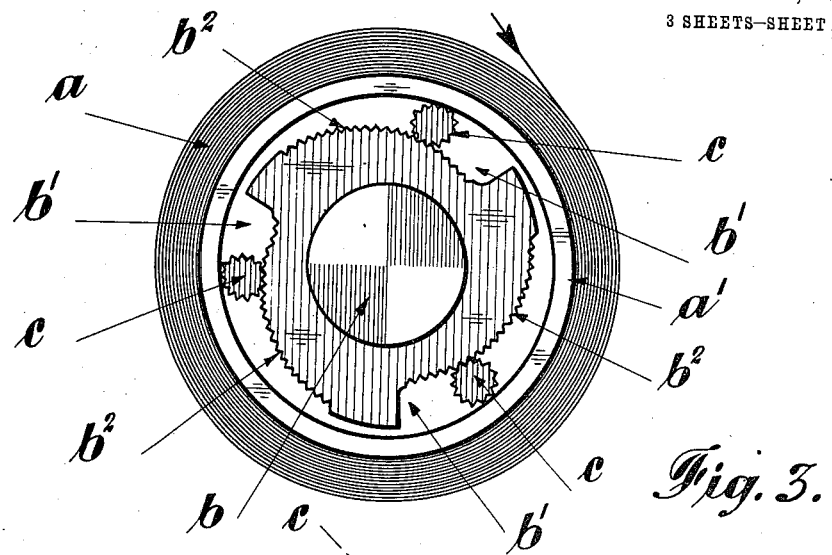
Figure 4:
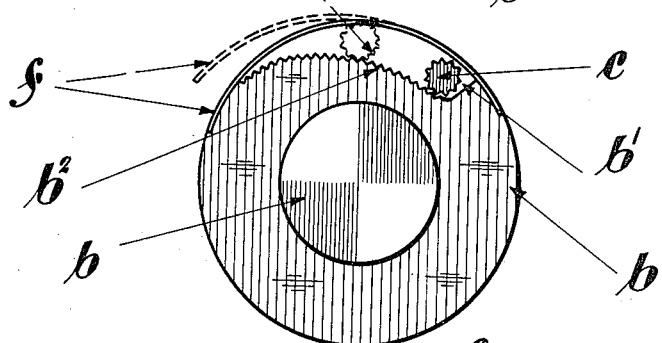

In Fig. 3 the recess $b'$ and rollers $c$ are shown with flutings or teeth, whereby the roller may be rotated to engage or disengage the shell, and whereby the roller has a better grip when coacting with the inclined faces. Each roller may be formed with a "squared" end for receiving a turning handle. In Fig. 4, the rod or roller is shown held in its recess by a spring blade $f$, consisting, say, of a very thin piece of brass or steel, preferably, extending the whole length of the body of the bar or core. In this example the rods or rollers will lie below the blades $f$ and serve to raise the latter when rotated outward and thus cause the bar or core to grip the reel or shell. This type of bar will be especially applicable for winding paper and the like without any strawboard or other shell, the winding-on being commenced when the rods or rollers and blades are in the position shown by dotted lines in Fig. 4. With the reel wound the rods or rollers could be rotated by means of a wrench or other suitable means to the inner position, as shown by the full lines in Fig. 4, and the blades will then collapse or retract and permit of the bar or spindle being removed.

Figure 5:
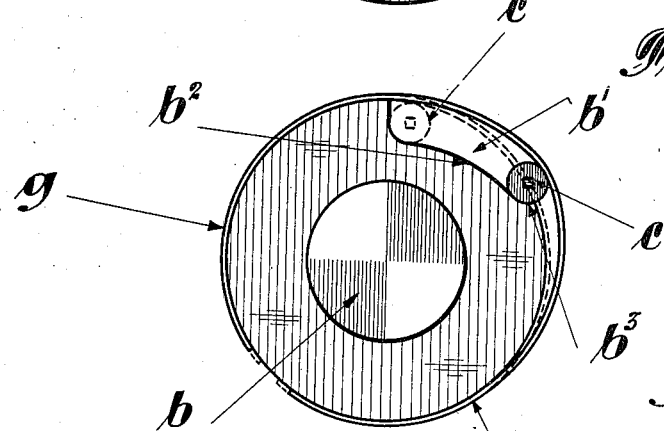
Figure 6:
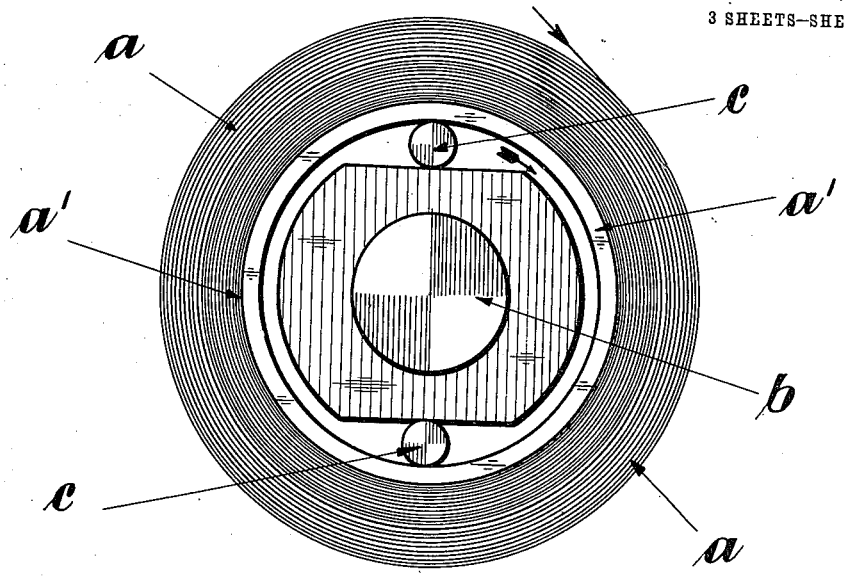
Figure 7:
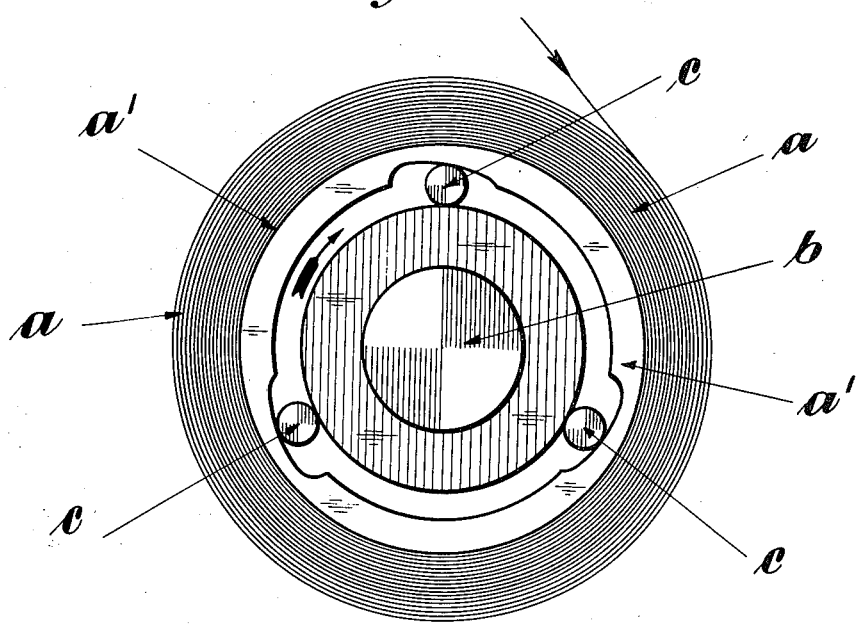

As shown in Fig. 5 there may be one rod only and such rod may be held to the spindle by a thin flexible covering or sleeve $g$ loosely encircling the spindle. The clutch surface and rod may be plain or fluted. In this as in the other arrangements the clutch surfaces may end in a small shoulder at $b^3$ by which the roller will be prevented leaving the clutch surface when moved to the extreme position. In lieu of the recesses $b'$ the spindle may be formed with flats see Fig. 6 and thus be adapted to operate (become clutched or unclutched) in either direction of rotation. When the reel shell will allow of it the recesses may be in the shell, and the shaft be circular, see Fig. 7.

What I claim is:—

1. In means for winding and unwinding paper, cloth and the like in web form, in combination, a bar or core comprising a parallel-sided central part and two end parts of smaller diameter than the central part, said central part being equal in length to the width of the web of paper or cloth and of a diameter slightly less than the internal diameter of the usual shell of the reel and having recesses on its periphery extending from end to end, a portion of the faces of each recess being eccentric to the axis of the core, and rods or rollers lying in such recesses, as set forth.

2. In means for winding and unwinding paper, cloth and the like in web form, in combination, a bar or core comprising a parallel-sided central part and two end parts of smaller diameter than the central part, and said central part being equal in length to the width of the web of paper or cloth, and having a recess on its periphery extending from end to end, a portion of the face of such recess being eccentric to the axis of the core, a thin flexible sleeve encircling the said central part of the core, and a rod between the core and sleeve, substantially as set forth.

In witness whereof I have hereunto set my hand in the presence of two witnesses.

SAMUEL MILNE.

Witnesses:
  FREDERICK PIATT,
  GEDDES WHITELAW.